(12) United States Patent
Fuellhaas et al.

(10) Patent No.: US 7,665,273 B2
(45) Date of Patent: Feb. 23, 2010

(54) METHOD FOR GENERATING A SUBSTANTIALLY UNINTERRUPTED CONNECTION OF THE PERIPHERAL WALL PORTIONS OF TWO ADJACENT TUBULAR SEGMENTS

(75) Inventors: Wolfgang Fuellhaas, Ibbenbüren (DE); Holger Lühn, Wietmarschen (DE)

(73) Assignee: General Electric Company, Schenectady, NY (US)

( * ) Notice: Subject to any disclaimer, the term of this patent is extended or adjusted under 35 U.S.C. 154(b) by 843 days.

(21) Appl. No.: 10/517,585

(22) PCT Filed: Apr. 9, 2003

(86) PCT No.: PCT/EP03/03681

§ 371 (c)(1),
(2), (4) Date: Sep. 30, 2005

(87) PCT Pub. No.: WO2004/090263

PCT Pub. Date: Oct. 21, 2004

(65) Prior Publication Data

US 2006/0123735 A1    Jun. 15, 2006

(51) Int. Cl.
*E04B 1/00* (2006.01)
*E04G 21/00* (2006.01)
*E04G 23/00* (2006.01)

(52) U.S. Cl. ............................. 52/745.04; 52/40; 52/849
(58) Field of Classification Search ................... 52/849, 52/848, 40, 632, 745.04; 403/292; 285/148.22
See application file for complete search history.

(56) References Cited

U.S. PATENT DOCUMENTS 1,765,946 A * 6/1930 Shea ........................... 220/565

(Continued)

OTHER PUBLICATIONS

PCT International Search Report, PCT/EP2003/003681 filed on Apr. 9, 2003, mailed on Nov. 6, 2003, pp. 2 total.

(Continued)

*Primary Examiner*—Richard E Chilcot, Jr.
*Assistant Examiner*—Chi Q Nguyen
(74) *Attorney, Agent, or Firm*—Blakely, Sokoloff, Taylor & Zafman LLP

(57) ABSTRACT

The method for generating a substantially uninterrupted connection of the peripheral wall portions of two adjacent tubular segments each provided with flanges having holes therein, of a tower, in particular for a wind energy turbine, comprises the steps of: arranging a first tubular segment (18) and a second tubular segment (20) with said flanges (26, 28) thereof facing each other and said holes (34, 36) in said flanges (26, 28) aligned with each other; connecting said tubular segments (18, 20) by prefastening screws (38) extending through said aligned holes (34, 36) in said flanges (26, 28); forming into the side (50) of the tubular segments (18, 20) opposite to the flanges (26, 28) a notch (52) of a predetermined width at least at a location of said contacting flanges (26, 28) where a gap (48) having a width greater than a minimum width exists; inserting into said notch (52) at least one insert part (60) having a width substantially equal to the width of said notch (52); and completely fastening said screws (38) connecting said flanges 826, 28) of said tubular segments (18, 20) providing a substantially uninterrupted connection of said peripheral wall portions (22, 24) of said tubular segments (18, 20) through said at least one insert part (60).

20 Claims, 3 Drawing Sheets

U.S. PATENT DOCUMENTS

Figure 1:
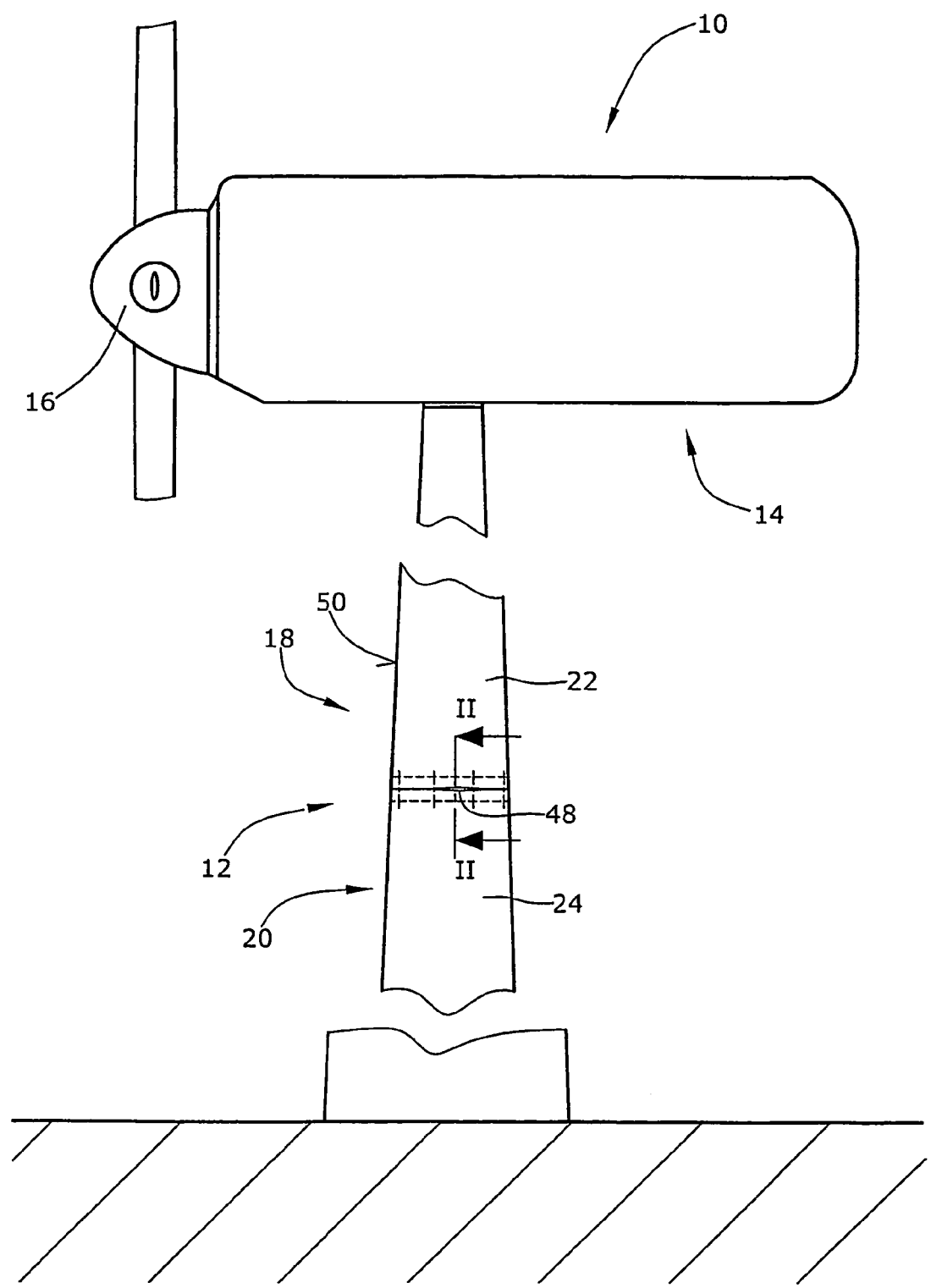

| | | | |
|---|---|---|---|
| 2,684,173 A * | 7/1954 | Schmitz | 220/645 |
| 3,193,129 A * | 7/1965 | Pfluger et al. | 220/4.16 |
| 3,421,781 A * | 1/1969 | Spurk | 285/148.22 |
| 3,793,794 A * | 2/1974 | Archer et al. | 52/632 |
| 3,981,409 A * | 9/1976 | Flanders | 220/4.07 |
| 4,086,013 A * | 4/1978 | Miller | 403/292 |
| 4,272,929 A * | 6/1981 | Hanson | 52/40 |
| 5,333,436 A * | 8/1994 | Noble | 52/849 |
| 5,687,537 A * | 11/1997 | Noble | 52/849 |
| 6,532,700 B1 * | 3/2003 | Maliszewski et al. | 52/40 |

OTHER PUBLICATIONS

Canadian Office Action, 2,487,429, mailed on Jun. 1, 2009, pp. 3 total.

* cited by examiner

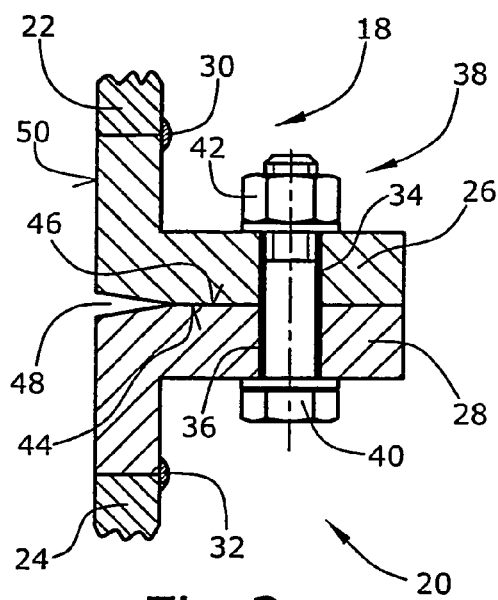 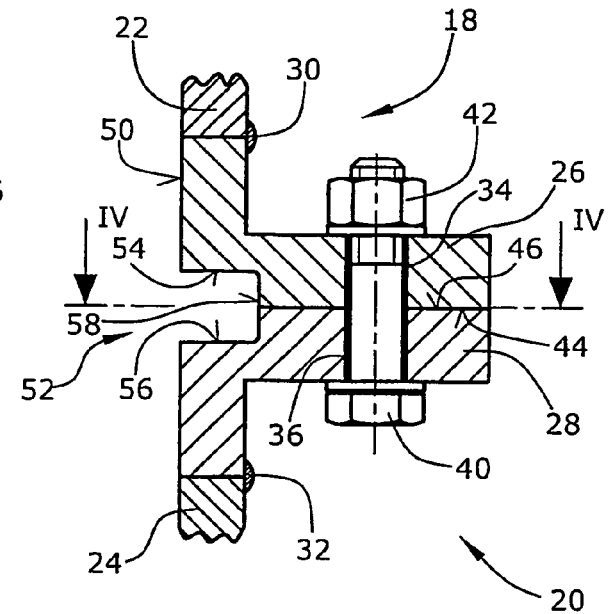
Fig.2  Fig.3
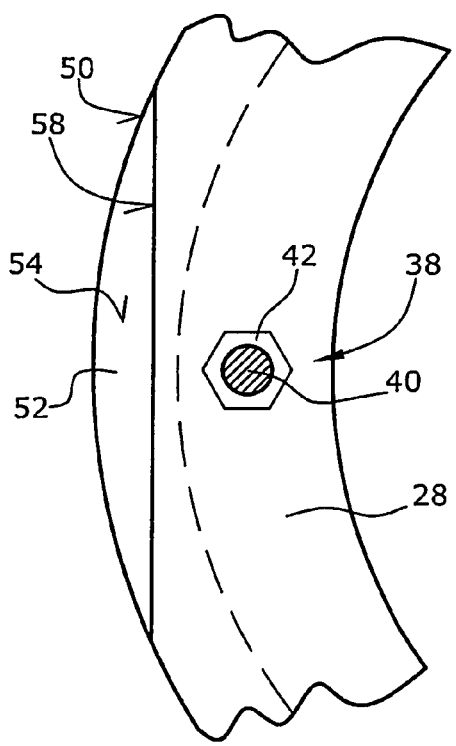 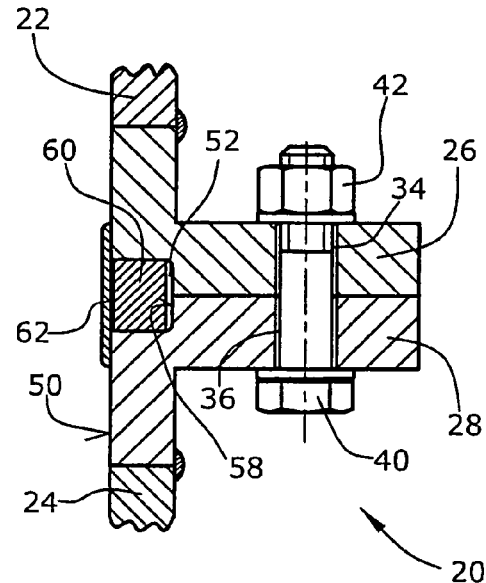
Fig.4  Fig.5

US 7,665,273 B2

METHOD FOR GENERATING A SUBSTANTIALLY UNINTERRUPTED CONNECTION OF THE PERIPHERAL WALL PORTIONS OF TWO ADJACENT TUBULAR SEGMENTS

CROSS-REFERENCE TO OTHER APPLICATIONS

This application is a National Phase Application of International Application No. PCT/EP2003/003681, filed Apr. 9, 2003, to which this application claims priority.

BACKGROUND OF THE INVENTION

1. Field of the Invention

The present invention relates to a method for generating a substantially uninterrupted connection of the peripheral wall portions of two adjacent tubular segments of a tower in particular for a wind energy turbine. This method applies both for new towers when erecting the same and for the repair of already built towers.

2. Related Prior Art

Tubular towers of for example wind energy turbines or other devices, like towers for supporting buildings or carrying whatever apparatus comprise several adjacent tubular segments wherein two adjacent tubular segments are connected, respectively. The tubular segments are provided with cylindrical or conical peripheral wall portions and inner or outer flanges which normally are welded to the peripheral wall portions. Two adjacent tubular segments are contacting each other along annular contact surfaces defined by the flanges at the longitudinal ends of each of the tubular segments. Since the contact surfaces of the flanges are not completely arranged in one single radial plane, small gaps can exist between two adjacent flanges when the tubular segments are connected to each other by fastening bolts and extending through holes in the flanges. However, those gaps are disadvantageous in particular at that side of the tubular segments being opposite to the flanges. Accordingly, if the tubular segments are provided inner flanges, i.e. with flanges extending radially inwardly, gaps at the outside of the peripheral wall portions of the tubular segments have to be prevented. Namely, those gaps result in little movements of adjacent tubular segments relative to each other causing a fatigue of the material which the tubular segments is made of and release of the screws resulting in turn in an earlier fatigue of the bolts connecting adjacent segments.

Accordingly, for preventing relative movements of adjacent tubular segments due to gaps one can manufacture tubular segments provided with absolutely perfect flanges which results in an increase of manufacturing costs. As an alternative it is possible to fill the gaps by insert elements having a thickness equal to the width of the gaps. However, since the gaps do not have a constant width over their longitudinal extension, insert elements of different thicknesses or several elements sandwiched have to be inserted at different locations of the gaps. This work is time consuming and cumbersome.

SUMMARY OF THE INVENTION

Accordingly, it is an object of the present invention to provide a method for generating a substantially uninterrupted connection of the peripheral wall portions of two adjacent tubular segments provided with flanges.

Another object of the present invention is to provide a method for repairing a tower comprised of adjacent tubular segments such that the peripheral wall portions of two adjacent tubular segments, respectively, are substantially uninterruptedly connected.

According to the present invention and for solving the above-mentioned objects there is provided a method for generating a substantially uninterrupted connection of the peripheral wall portions of two adjacent tubular segments each provided with flanges having holes therein, of a tower, in particular for a wind energy turbine, wherein the method comprises the steps of arranging a first tubular segment and a second tubular segment with said flanges thereof facing each other and said holes in said flanges aligned with each other, connecting said tubular segments by prefastening screws extending through said aligned holes in said flanges, forming into the side of the tubular segments opposite to the flanges a notch of a predetermined width at least at a location of said contacting flanges where a gap having a width greater than a minimum width exists, inserting into said notch at least one insert part having a width substantially equal to the width of said notch, and completely fastening said screws connecting said flanges of said tubular segments providing a substantially uninterrupted connection of said peripheral wall portions of said tubular segments through said at least one insert part.

In the method according to the invention, two adjacent tubular segments of a tower, in particular for a wind energy turbine, are connected to each other by screws extending through aligned holes in the flanges of the two adjacent tubular segments. The screws are prefastened, i.e. are not completely fastened. When using the method upon erecting a tower, the screws after insertion are prefastened while when using the method for repairing an already built tower, the screws are released slightly. In the next step, the interface between adjacent flanges, i.e. the contact surfaces of the flanges at the side of the tubular segments opposite to the flanges are checked to determine locations at which gaps having a width greater than a minimum width exist. At these locations of the flange interfaces, a notch, in particular a groove of a predetermined width, i.e. of a predetermined dimension in the longitudinal extension of the tubular segments is cut or formed in another way into the side of the tower opposite to the flanges. Thereafter, insert parts, preferably plate-like insert parts, of elements having a width substantially equal to the width of the groove are inserted into the groove so that the latter is filled out between the side edges thereof. Prior to the insertion of the insert parts a coating can be applied to the inner surfaces and edges of the grooves for protecting the tubular segments against corrosion. After the insertion of the insert parts, the screws are completely fastened. The insert parts function as spacers fixedly clamped between adjacent tubular segments and in particular between the peripheral wall portions thereof thereby providing a substantially uninterrupted connection of the peripheral wall portions of the tubular segments which prevents any relative tilting movements of the adjacent tubular segments.

The advantages of the present invention over the prior art are that insert parts of a defined width can be used at each location of the groove avoiding the time consuming work of searching for insert parts having the thickness required at a specific location of a groove having a varying width over its length.

For the invention it is not necessary that the groove is completely filled with insert parts. However, what is important is that the groove is provided with insert parts contacting the opposite edges of the groove wherein at both sides of an insert part a space can be provided. Also the insert parts need not necessarily extend from the outer surface of a wall portion up to the bottom of the groove. The insert parts should arranged within the groove such that parts thereof extend substantially at least up to the outer surface of the wall portions. Accordingly, the insert parts can project from or can be retracted with respect to the outer surface of the wall portions. However it is most preferred that the insert parts are aligned with the outer surface of the tower.

According to the invention, the groove can be cut into merely one of the wall portions of the two adjacent tubular segments with the one side edge of the groove being located in the wall portion of one of the two tubular segments and the other side edge of the groove being defined by the contact surface of the flange of the other tubular segment. However, it is preferred to cut the groove into the peripheral wall portions of both of the tubular segments.

According to another preferred embodiment of the present invention, the groove comprises a depth which is substantially identical to a thickness of the wall portion of the tubular segments. If the thicknesses of the wall portions of two adjacent tubular segments are different which basically can be possible because the wall thicknesses of the upper segments of a tower are less than the wall thicknesses of the lower segments, the groove should have a depth substantially equal to the smaller thickness.

The width and depth of a groove cut into at least one of the two tubular segments according to the invention depend on the overall sizes of the segments and the tower. Basically, these dimensions range from a few millimeters to a few centimeters in particular 1 or 2 centimeter.

The groove as cut into at least one of the tubular segments according to the invention can be curved thereby following the curvature of the peripheral wall portions of the segments or can be straight which is preferred because of its easier manufacture. In case of a groove extending straightly, the orientation of the groove with respect to the peripheral wall portions is secantially. Such a groove has a varying depth over its longitudinal extension.

In a preferred embodiment of the present invention, cutting the groove is performed by a milling cutter tool. Such a tool can be guided along a guidance of a frame of a cutting device provided with the cutting tool. The cutting device has to be aligned relative to the tubular segments in order to cut a groove of desired shape and orientation.

The present invention is described so far referring to embodiments in which a groove is cut into at least one of the tubular segments. However, the present invention in more general terms also applies for providing any kind of notch in at least one of the tubular segments as long as the opposite side edges of the notch are arranged in both of the tubular segments. Accordingly, instead of a groove it is also possible to provide a bore into the tubular segments and to insert into such a bore a bolt-like insert part contacting the opposite side edges of the bore. Several such bore-like notches can be arranged along a gap existing between two adjacent tubular segments.

DETAILED DESCRIPTION OF THE DRAWING

Figure 6:
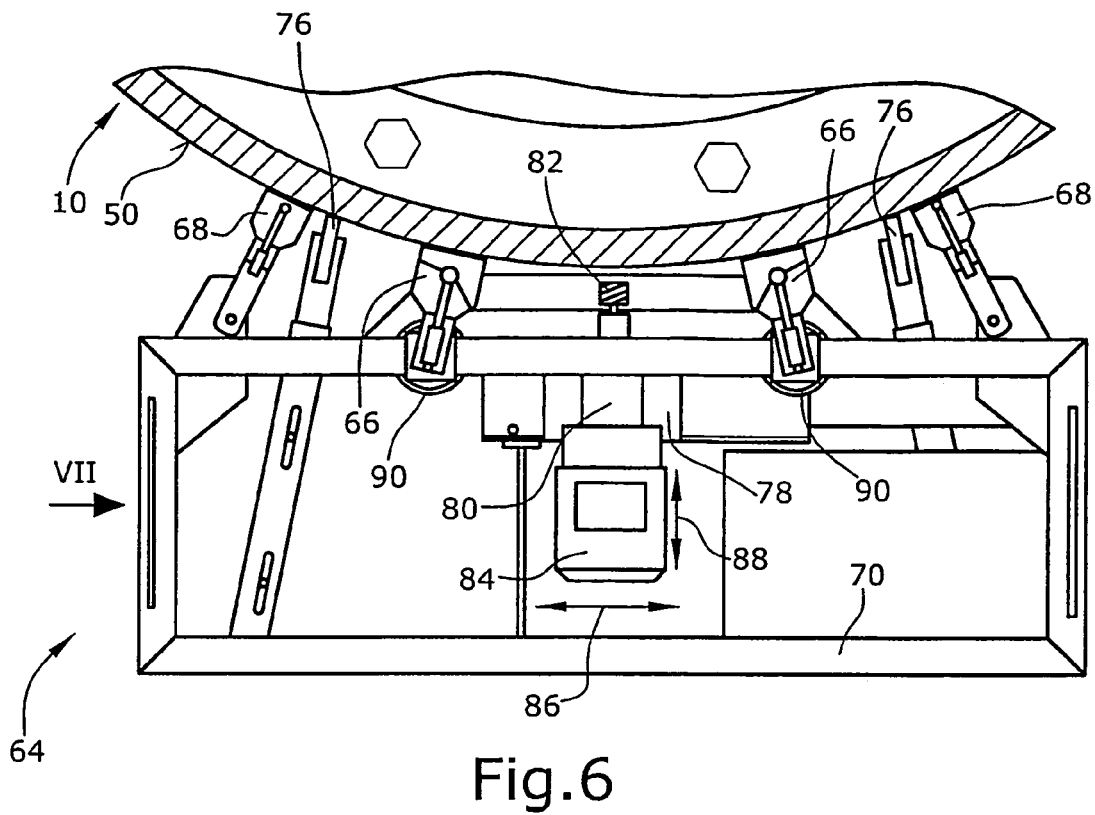
Figure 7:
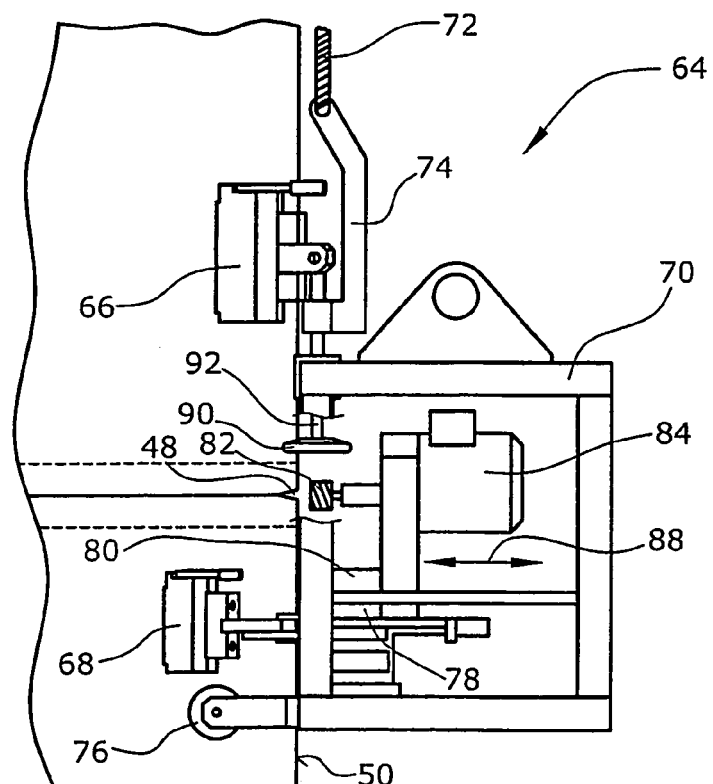

The present invention will be described in more detail hereinbelow referring to a preferred embodiment of the invention depicted in the drawing wherein FIG. 1 shows a side view of the interface of two adjacent tubular segments of a tower of a wind energy turbine with a small gap between the flanges of the two tubular segments, FIG. 2 shows a cross sectional view taken along line II-II of FIG. 1, FIG. 3 shows a cross sectional view taken along line II-II of FIG. 1 after forming a groove at the location of the former gap, FIG. 4 shows a cross sectional view taken along line IV-IV of FIG. 3 for showing the shape and extension of the groove, FIG. 5 shows a cross section view similar to that of FIG. 3 wherein the groove is partially filled with an insert part and covered at its opening by a covering tape, FIG. 6 shows a top view of a cutting device provided with a milling cutter for cutting a grooving into the outer surface of two adjacent tubular segments, and FIG. 7 shows a side view in the direction of arrow VII of FIG. 6.

DESCRIPTION OF A PREFERRED EMBODIMENT

In FIG. 1 the main components of a wind energy turbine are shown schematically. According to FIG. 1 a wind energy turbine 10 comprises a tower 12 and a nacelle 14 supported on top of the tower 12 and provided with a rotor 16. The tower 12 comprises several tubular segments made of steel or other suitable materials as known to those skilled in the art.

Two adjacent tubular segments 18,20 are shown in more detail in FIGS. 1 and 2. Each tubular segment 18,20 comprises a substantially cylindrical or conical peripheral wall portion 22,24 to the longitudinal ends of which an L-shaped flange 26,28 is attached by e.g. welding generating a welding seam 30,32. In the embodiment the flanges 26,28 extend radially inwardly so as to form inner flanges. However, the invention is not limited to tubular segments having inner flanges and, accordingly, also applies for tubular segments having their flanges extending radially outwardly (outer flanges).

Each flange 26,28 is provided with a plurality of holes 34,36 through with clamping screws 38 for connecting the flanges of adjacent tubular segments 18,20 extend. Each screw 38 comprises a bolt 40 having a widened end as well as a threaded end, and a nut 42 engaged with the threaded end of the bolt 40. Other types of screws i.e. screws being in direct threading engagement with the flanges are also suitable.

The flanges 26,28 of adjacent tubular segments 18,20 define outer contact surface 44,46 for contacting each other and along which the flanges 26,28 are pressed against each other when screwing the nuts 42 onto the bolts 40 of the screws 38. For providing a uniform surface contact between the flanges 26,28 of adjacent tubular segments 18,20, the contact surfaces 44,46 thereof have to be perfectly parallel. However, this is difficult to achieve when manufacturing flanges and the tubular segments 18,20 because due to e.g. the welding process, the flanges 26,28 will not be perfectly parallel along their entire contact surfaces 44,46. Accordingly, what happens in practice is that little slot-like gaps 48 exist when the tubular segments 18,20 are assembled. Those gaps 48 leads to interruptions at the outer side 50 of the outer wall of the tower 10 at the interfaces between two adjacent segments 18,20, respectively. Due to the gaps 48 rather little relative tilting movements between adjacent tubular segments 18,20 are possible which will cause mechanical stress to the flanges 26,28 and their connections to the peripheral wall portions 22,24 at the welding sides resulting in fatigue of the material.

In order to prevent such relative tilting movements, it is known in the prior art to insert into the gap 48 insert parts the thicknesses of which is adapted to correspond to the varying width of the gap 48 to be filled.

According to the invention, a gap 48 located in the wall of the tower at an interface of the flanges 26,28 of two adjacent tubular segments 18,20, is widened by cutting a predetermined groove 52 into the wall at the location of a gap 48. Such groove 52 is shown in FIG. 3 and is formed with the screws 38 not completely fastened but merely prefastened. The groove 52 comprises two opposite side surfaces 54,56 the distance therebetween defines the width of the groove 52, and a bottom surface 58 defining the depth of the groove 52. The width of the groove 52 extends along both wall portions 22,24 while the bottom surface can substantially be in alignment with the inner surfaces of the wall sections 22,24 of the tubular segments 18,20. The groove 52 is formed to the outer side 50 of the tubular segments 18,20 by means of an apparatus as described later in connection with FIGS. 6 and 7.

The shape of the groove 52 and its orientation is shown in FIG. 4. In this embodiment the bottom surface 58 of the groove 52 extends secantially. However, it is also possible to cut into the tubular segments a groove 52 having a bent bottom surface 58 curved e.g. in accordance with the curvature of the tubular segments 18,20.

According to the invention, at least one insert element 60 having a thickness substantially equal to the width prefabricated of the groove 52, is inserted therein. This insert part 60 contacts the opposite side walls 54,56 of the groove 52. Accordingly, the insert part 60 is clampingly engaged in the groove 52 and provides a press fit therein after the screws 38 are completely fastened i.e. are pulled completely tight. Thereafter, a covering tape 62 is attached to the outer side 50 of the wall portions 22,24 of the tubular segments 18,20. Since the groove 52, other than the gap 48, is formed so as to have a defined width and depth, the insert parts 60 in any event will fit into the groove avoiding manually selecting and trying different types of insert parts as in case of the prior art.

The above-mentioned situation is shown in FIG. 5. It is to be noted here that prior to the insertion of the insert parts 60 the inner surfaces 54,56,58 of the groove 52 can be coated with a corrosion protective coating which is not shown in FIG. 5.

Due to the press-fitted insert parts 60 in the groove 52 there is a continuous uninterrupted connection between the peripheral wall portions 22,24 of adjacent tubular segments 18,20 resulting in the transmission of axial forces from the peripheral wall portion of the one tubular segment to the peripheral wall portion of the an adjacent tubular segment directly through the insert parts 60 avoiding any relative movements of the peripheral wall portions 22,24 of the two adjacent tubular segments 18,20.

Referring now to FIGS. 6 and 7, an embodiment of a cutting device 64 for cutting the groove 52 at the interface of two adjacent tubular segments 18,20 of the tower 10 will be described hereinbelow in further detail.

As can be seen in these Figures, the cutting device 64 is mounted at the outer side 50 of two adjacent tubular segments 18,20 by means of two upper magnetic fastening elements 66 and two lower magnetic fastening elements 68 all of which are connected to a frame 70 of the cutting device 64. Moreover, the frame 70 is also secured by means of wires 72 of a winch (not shown) attached at the top of the tower 10 i.e. within the nacelle 14 and connected to hanger elements 74 which in turn are connected to the top portion of the frame 70. At the bottom of the frame 70 there are provided two guidance rollers 76 spacing and guiding the frame 70 at the outer surface of the tubular segments 18,20. Within the frame 70 there is arranged a guidance 78 along which a tool support 80 for a milling cutter tool 82 is slidable. The milling cutter tool 82 can be driven by a drive unit 84 also supported by the tool support 80. The tool support 80 can slide in either direction of arrow 86 and can also be displaced radially inwardly and outwardly with respect to the tower 10 as shown by arrow 88.

Installation and operation of the cutting tool 64 are as follows. The frame 70 is connected to the wires 72 via the two hanger elements 74 and is lifted up to the level where a gap has to be cut. Thereafter the magnetic fastening element 66,68 are activated so that the cutting device 64 is fixedly mounted at the outer surface of the tubular segments 18,20. Then the whole frame 70 is adjusted by operating two adjustment wheels 90. The adjustment wheels 90 are connected to threaded rods 92 extending through the frame 70 and being in engagement with the hanger elements 74. By rotating the adjustment wheels 76 the position of the hanger elements 74 along the threaded rods 78 can be adjusted thereby aligning the frame 70 with respect to the tower and, accordingly, the milling cutter tool 82 with respect to the gap to be manufactured.

As an alternative, orientation of the milling cutter tool can also be provided by adjusting the guidance 78 relative to the frame 70.

After that operation of the milling cutter tool 82 is initiated in that the tool support 80 is moved towards the tubular segments 18,20 and perpendicular thereto (according to arrow 86) so as to form the groove 52 as for example shown in FIGS. 3 and 4.

If the groove 52 has to be elongated in or additional grooves 52 have to be formed at different locations along the circumferencial direction of the tower, after disabling the magnetic fasteners 66,68 the frame 70 is displaced in circumferencial direction. By this measures different portions of the groove 52 or different grooves can be formed in the tubular segments 18,20.

After removal of the cutting tool 84, the remaining steps of the method according to the invention as described above can be performed.

The invention can be used for towers just build as well as for the repair of already existing towers.

Although the invention was described so far referring to an embodiment in which a groove is cut into the peripheral wall portions of two adjacent tubular segments. However, instead of a groove also recesses or notches of a different shape than that of a groove can be cut into the tubular segments. Moreover, instead of cutting also other methods i.e. drilling for forming a recess or notch in the tubular segments are possible.

Although the invention has been described and illustrated with reference to specific illustrative embodiments thereof, it is not intended that the invention be limited to those illustrative embodiments. Those skilled in the art will recognise that variations and modifications can be made without departing from the true scope of the invention as defined by the claims that follow. It is therefore intended to include within the invention all such variations and modifications as fall within the scope of the appended claims and equivalents thereof.

The invention claimed is:

1. A method for generating a substantially uninterrupted connection of peripheral wall portions of two adjacent tubular segments each provided with flanges having holes therein, of a tower, wherein the method comprises:
   arranging a first tubular segment and a second tubular segment with said flanges thereof facing each other and said holes in said flanges aligned with each other,
   connecting said tubular segments by prefastening screws extending through said aligned holes in said flanges, forming into a side of the tubular segments opposite to the flanges a notch of a predetermined width at least at a location of said contacting flanges where a gap, exists, inserting into said notch at least one insert part having a width substantially equal to the width of said notch, and completely fastening said screws connecting said flanges of said tubular segments providing a substantially uninterrupted connection of said peripheral wall portions of said tubular segments through said at least one insert part.

2. The method according to claim 1, wherein said notch is formed such that said notch partially extends in both of said tubular segments.

3. The method according to claim 1, wherein said notch comprises a depth which is substantially equal to a thickness of said peripheral wall portions of said tubular segments.

4. The method according to claim 3, wherein said tubular segments have peripheral wall portions of different thicknesses and wherein the depth of said notch is substantially equal to the smaller tubular segment wall portion thickness.

5. The method according to claim 4, wherein said notch is formed such that said notch extends straightly and oriented secantially with respect to the extension of said peripheral wall portions of said tubular segments.

6. The method according to claim 5, wherein forming said notch is performed by means of a milling cutter tool.

7. The method according to claim 6, wherein forming said notch is performed by a cutting device having a frame and a cutting tool mounted to said frame and slidable along a guidance of said frame, wherein said frame is fixedly arranged with respect to at least one of said tubular segments by fastening elements and wherein said cutting tool is aligned for cutting a notch having the desired orientation with respect to said tubular segments.

8. The method according to claim 7, wherein said frame, when fixedly arranged with respect to said tubular segments, is adjusted with respect to said fastening elements for aligning said cutting tool with respect to said tubular segments.

9. The method according to claim 8, wherein said fastening elements are selected from the group comprising tension belt arranged around at least one of said tubular segments for mechanically mounting said frame to at least one of said tubular segments, and solenoid elements for magnetically mounting said frame to at least one of said tubular segments.

10. The method according to claim 9, wherein the frame is suspended at at least one wire, chain or the like element fixed on top of the tower.

11. A method for generating a substantially uninterrupted connection of peripheral wall portions of two adjacent tubular segments of a tower, wherein the tubular segments are provided with flanges having holes therein and fastened screws are extending through the holes of the contacting flanges of the tubular segments, the method comprising:

releasing the screws of said contacting flanges of said tubular segments, forming into a side of the tubular segments opposite to the flanges a notch of a predetermined width at least at one location of said contacting flanges where a gap exists, inserting into said notch at least one insert part having a width substantially equal to the width of said notch, and completely fastening said screws connecting said flanges of said tubular segments providing a substantially uninterrupted connection of said peripheral wall portions of said tubular segments through said at least one insert part.

12. The method according to claim 11, wherein said notch is formed such that said notch partially extends in both of said tubular segments.

13. The method according to claim 12, wherein said notch comprises a depth which is substantially equal to a thickness of said peripheral wall portions of said tubular segments.

14. The method according to claim 13, wherein said tubular segments have peripheral wall portions of different thicknesses and wherein the depth of said notch is substantially equal to the smaller tubular segment wall portion thickness.

15. The method according to claim 14, wherein said notch is formed such that said notch extends straightly and oriented secantially with respect to the extension of said peripheral wall portions of said tubular segments.

16. The method according to claim 15, wherein forming said notch is performed by means of a milling cutter tool.

17. The method according to claim 16, wherein forming said notch is performed by a cutting device having a frame and a cutting tool mounted to said frame and slidable along a guidance of said frame, wherein said frame is fixedly arranged with respect to at least one of said tubular segments by fastening elements and wherein said cutting tool is aligned for cutting a notch having the desired orientation with respect to said tubular segments.

18. The method according to claim 17, wherein said frame, when fixedly arranged with respect to said tubular segments, is adjusted with respect to said fastening elements for aligning said cutting tool with respect to said tubular segments.

19. The method according to claim 18, wherein said fastening elements are selected from the group comprising tension belt arranged around at least one of said tubular segments for mechanically mounting said frame to at least one of said tubular segments, and solenoid elements for magnetically mounting said frame to at least one of said tubular segments.

20. The method according to claim 19, wherein the frame is suspended at at least one wire, chain or the like element fixed on top of the tower.

* * * * *

UNITED STATES PATENT AND TRADEMARK OFFICE
CERTIFICATE OF CORRECTION

PATENT NO. : 7,665,273 B2
APPLICATION NO. : 10/517585
DATED : February 23, 2010
INVENTOR(S) : Fuellhaas et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1172 days.

Signed and Sealed this

Seventh Day of December, 2010

David J. Kappos
*Director of the United States Patent and Trademark Office*